United States Patent
Hottinen et al.

(10) Patent No.: US 7,502,421 B2
(45) Date of Patent: Mar. 10, 2009

(54) HIGH RATE TRANSMISSION DIVERSITY TRANSMISSION AND RECEPTION

(75) Inventors: Ari Hottinen, Espoo (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/639,226

(22) Filed: Dec. 15, 2006

(65) Prior Publication Data

US 2007/0165739 A1  Jul. 19, 2007

Related U.S. Application Data

(62) Division of application No. 10/500,633, filed as application No. PCT/FI03/00004 on Jan. 3, 2003, now Pat. No. 7,436,896.

(60) Provisional application No. 60/346,482, filed on Jan. 4, 2002.

(51) Int. Cl.
*H04B 7/02* (2006.01)

(52) U.S. Cl. ..................................... 375/267

(58) Field of Classification Search ................ 375/267, 375/347, 349; 700/53; 455/101, 132–141
See application file for complete search history.

(56) References Cited

U.S. PATENT DOCUMENTS

| | | | |
|---|---|---|---|
| 4,001,692 A * | 1/1977 | Fenwick et al. .............. 714/797 |
| 5,701,333 A * | 12/1997 | Okanoue et al. ............. 375/347 |
| 6,088,408 A * | 7/2000 | Calderbank et al. ......... 375/347 |
| 6,307,882 B1 * | 10/2001 | Marzetta ..................... 375/224 |
| 6,356,555 B1 * | 3/2002 | Rakib et al. .................. 370/441 |
| 6,587,515 B1 * | 7/2003 | Jafarkhani et al. ........... 375/299 |
| 6,661,856 B1 * | 12/2003 | Calderbank et al. ......... 375/347 |
| 6,724,842 B1 * | 4/2004 | Hochwald et al. ........... 375/347 |
| 6,891,897 B1 * | 5/2005 | Bevan et al. ................. 375/265 |
| 6,925,131 B2 * | 8/2005 | Balakrishnan et al. ....... 375/299 |
| 6,987,819 B2 * | 1/2006 | Thomas et al. .............. 375/342 |
| 7,046,737 B2 * | 5/2006 | Lo et al. ...................... 375/267 |
| 7,069,050 B2 * | 6/2006 | Yoshida ................... 455/562.1 |
| 7,072,409 B2 * | 7/2006 | Suzuki et al. ................ 375/259 |
| 7,103,115 B2 * | 9/2006 | Li ............................... 375/340 |
| 7,158,579 B2 * | 1/2007 | Hottinen ..................... 375/267 |
| 2002/0154704 A1 * | 10/2002 | Reshef ........................ 375/262 |
| 2002/0196842 A1 * | 12/2002 | Onggosanusi et al. ....... 375/148 |
| 2003/0035490 A1 * | 2/2003 | Gollamudi ................... 375/267 |
| 2003/0043929 A1 * | 3/2003 | Sampath ..................... 375/267 |
| 2003/0198303 A1 * | 10/2003 | Taylor et al. ................ 375/340 |

(Continued)

OTHER PUBLICATIONS

TSGR1#20(01)-0459, TSG-RAN Working Group 1 meeting #20, May 21-25, 2001, Busan, Korea, "Improved Double-STTD Schemes Using Asymmetric Modulation and Antenna Shuffling".

(Continued)

*Primary Examiner*—Sam K Ahn
(74) *Attorney, Agent, or Firm*—Squire, Sanders & Dempsey, LLP

(57) ABSTRACT

The performance and symbol rate in a wireless mobile system are increased by forming a transmission code matrix using transformed orthogonal codes, in such a way that the code is robust to channel statistics and operates well in both Ricean and (correlated) Rayleigh channels. Furthermore, the invention enables high symbol rate transmission using multiple transmit antennas, and one or multiple receive antennas, and obtains simultaneously high diversity order and high symbol or data rate.

26 Claims, 3 Drawing Sheets

U.S. PATENT DOCUMENTS

| | | | | |
|---|---|---|---|---|
| 2003/0219080 | A1* | 11/2003 | Alamouti et al. | 375/299 |
| 2004/0081263 | A1* | 4/2004 | Lee et al. | 375/347 |
| 2005/0063483 | A1* | 3/2005 | Wang et al. | 375/267 |
| 2007/0165739 | A1* | 7/2007 | Hottinen et al. | 375/267 |

OTHER PUBLICATIONS

"Complex space-time block codes for four Tx antennas", Tirkkonen et al, Global Telecommunications Conference, 2000, Globecom '00, IEEE Nov. 27-Dec. 1, 2000, pp. 1005-1009, vol. 2.

"Improved MIMO performance with non-orthogonal space-time block codes", Tirkkonen et al, Global Telecommunications Conference, 2001. Globecom '01. IEEE Nov. 25-29, 2001, pp. 1122-1126, vol. 2.

"Minimal non-orthogonality rate 1 space-time block code for 3+ Tx antennas", Tirkkonen et al, Spread Spectrum Technique and Applications, 2000, IEEE Sixth International Symposium on, Sep. 6-9, 2000, pp. 429-432, vol. 2.

TSGR1#20(01)-0578, TSG-RAN Working Group 1 meeting #20, May 21-25, 2001, Busan, Korea, "STTD-OTD open-loop transmit diversity scheme for HSDPA systems with four transmit antennas," pp. 1-5.

"A Transmit Diversity Scheme for Channels with Intersymbol Interference", Lindskog et al, IEEE 2000, pp. 307-311.

"Optimizing Space-Time Block Codes by Constellation Rotations", Olav Tirkkonen, Finnish Wireless Communications Workshop FWCW'01, Tampere, Finland, Oct. 2001, pp. 59-60.

* cited by examiner

HIGH RATE TRANSMISSION DIVERSITY TRANSMISSION AND RECEPTION

CROSS-REFERENCE TO RELATED APPLICATIONS

This application is a divisional application of U.S. patent application Ser. No. 10/500,633, filed Jul. 30, 2004, which is a 371 application of International Application No. PCT/FI03/00004, filed on Jan. 3, 2003, and which claims priority from U.S. Provisional Patent Application No. 60/346,482 filed Jan. 4, 2002. The disclosures of the prior application are hereby incorporated by reference.

FIELD OF THE INVENTION

This invention relates to methods and systems for achieving joint high data transmission and diversity in both space and time/frequency in a telecommunication system.

BACKGROUND OF THE INVENTION

Signal transmission in wireless communication systems is subject to fading which often reduces the achievable throughput and data rates or achievable quality-of-service. Transmission environments with obstacles lead to multi-path signal propagation, and the power of combined effective received signal power can diminish reducing the link capacity significantly. In addition, due relative speed between the transmitter and the receiver, or the intermediate objects between the transmitter and the receiver, the fading changes dynamically in time and space.

A typical countermeasure for a fading channel is to employ receiver diversity with multiple receive antennas. Multiple receive antennas are often expensive to implement and subsequently alternative solutions have been sought for. Transmit diversity is an alternative solution in which more than one transmit antenna is used to transmit the signal. Both of these techniques create artificial multi-path channels and the probability that all channels fail simultaneously is significantly reduced, thus improving the quality of the received signal.

One transmit diversity solution is disclosed in U.S. Pat. No. 6,185,258 to Alamouti et al., which is incorporated herein by reference. The Alamouti matrix $C_{Ala}$ is shown below in equation (1), with each row corresponding to a transmit antenna, or a beam, and each column corresponding to a symbol period.

$$C_{Ala}(z_1, z_2) = \begin{bmatrix} z_1 & -z_2^* \\ z_2 & z_1^* \end{bmatrix} \quad (1)$$

The Alamouti scheme is called a 2 by 2 space-time block code, as it employs two transmit antennas or beams during two symbol periods. As an alternative of time-division, transmitting different columns during different symbol periods, any other substantially orthogonal division of the available transmission resources may be used, e.g. different frequency subcarriers or Fourier/wavelet waveforms (space-frequency code) or different (spreading) codes (space-code-code) may be used. To stress this multitude of uses of a given code matrix, the term "transmit diversity code" shall be used for codes of the type discussed above, which may be used when a spatial (antenna or beam) dimension is available, together with any substantially orthogonal division of other transmission resources, including time and bandwidth. The transmit diversity of the Alamouti code is two, as taught in the U.S. Pat. No. 6,185,258. The symbol rate is one, since two symbols are transmitted in two time slots. The code formed according to equation (1) is orthogonal, in the sense that, when multiplied together with its Hermitian transpose, it yields a scaled identity matrix. The Hermitian transpose of a matrix A, denoted by $A^H$, is the complex conjugate transpose of A. The transpose of a matrix is derived by reversing the row and column indices of the matrix. The identity matrix, denoted "I", is a matrix with each element on its diagonal equal to unity and all other elements each to zero. Accordingly, for an orthogonal-based matrix A, it holds that $A^H A = AA^H = k\, I$, for some real value k. The orthogonality of the Alamouti matrix enables separate decoding of the two symbols, in such a way that that symbols do not interfere with each other.

The Alamouti transmit diversity is optimized for channels in which there is little or no intersymbol interference (ISI) on the channel. ISI distorts the received signal and exacerbates reception, thus reducing signal quality. The time delayed signals, also known as temporal multi-path components, can be also advantageous. In CDMA systems one may, as an example, employ a separate transmit diversity block code decoder for each multi-path component, and then combine the output using any suitable diversity combining method, including as an example equal gain combining, or maximal ratio combining. Alternatively, an equalizer may be used to combine the multi-path propagated signals, and possibly to simultaneously remove inter-symbol-interference. Lindskog and Paulraj have proposed in "A Transmit Diversity Scheme for Channels with Intersymbol Interference", Proc. IEEE ICC2000, 2000, vol. 1, pp. 307-311, an orthogonal transmit diversity block code that, unlike the Alamouti code, is effective on ISI channels. This paper is incorporated herein by reference.

Orthogonal transmit diversity codes suffer from rate limitation problems, as taught in O. Tirkkonen and A. Hottinen, "Complex space-time block codes for four Tx antennas" in Proc. Globecom 2000, San Francisco, USA, November/December 2000, incorporated herein by reference. As an example, the maximal symbol rate for an orthogonal transmit diversity code with four transmit antennas or beams is ¾. When the rate loss is not desired the code orthogonality has to be sacrificed. Indeed, O. Tirkkonen, A. Boariu, A. Hottinen, "Minimal non-orthogonality space-time code for 3+transmit antennas," in Proc. IEEE ISSSTA 2000, September, NJ, USA, teach one such method (e.g. the ABBA code). In this code the signal is transmitted in using the transmit diversity code matrix $$C_{NOSTBC} = \begin{bmatrix} z_1 & -z_2^* & z_3 & -z_4^* \\ z_2 & z_1^* & z_4 & z_3^* \\ z_3 & -z_4^* & z_1 & -z_2^* \\ z_4 & z_3^* & z_2 & z_1^* \end{bmatrix} \quad (2)$$

It is seen that the code comprises as sub-matrices the Alamouti code. The aforementioned paper is incorporated herein by reference. The code described above yields good performance in a fading channel but due to the structure of the non-orthogonality, there is an inherent performance loss in correlated channels or in Ricean channels, where known orthogonal transmit diversity codes perform better. The performance of non-orthogonal codes, exemplified by (2), can be improved by employing possibly matrix valued constellation rotations, as discussed in O. Tirkkonen, "Optimizing space-time block codes by constellation rotations," Finnish Wireless Communications Workshop, October 2001, which is incorporated here by reference. The idea is that if the symbols in different orthogonally encoded blocks, exemplified by the pairs z1,z2 and z3,z4 in (2) are taken from different constellations, the performance of the code is much improved. This can be realized by constellation rotations.

A simpler, limited diversity space-time code construction has been proposed for WCDMA systems. The orthogonal code is called STTD-OTD in 3GPP document TSGR1#20 (01)-0578, incorporated herein by reference. It combines two Alamouti codes in such a way that the symbol rate is one (with four transmit antennas), but so that the system only enjoys limited diversity order. The transmission code matrix is $$C_{STTD\text{-}OTD} = \begin{bmatrix} z_1 & z_1 & z_2 & z_2 \\ -z_2^* & -z_2^* & z_1^* & z_1^* \\ z_3 & -z_3 & z_4 & -z_4 \\ -z_4^* & z_4^* & z_3^* & -z_3^* \end{bmatrix}$$

With four antennas the diversity order is only two when four is the maximum achievable. It is noted that the STTD-OTD code above contains two Alamouti blocks, and it can be written using the Alamouti matrix, given earlier, after changing the column indices 2 and 3. Alternatively, to obtain essentially the same diversity as with STTD-OTD one may combine antenna hopping and the Alamouti code, in which case the space-time matrix is $$C_{STTD\text{-}AHOP} = \begin{bmatrix} z_1 & -z_2^* & & \\ z_2 & z_1^* & & \\ & & z_3 & -z_4^* \\ & & z_4 & z_3^* \end{bmatrix} \quad (3)$$

It is seen that the matrix contains four symbols and occupies four time slots, and hence the symbol rate is one, although all symbols are not transmitted from all antennas, thus limiting the achievable diversity to two.

Transmit diversity block codes have been designed also for parallel high rate transmission over fading channels, as taught by O. Tirkkonen and A. Hottinen, "Improved MIMO transmission using non-orthogonal space-time block codes," in Proc. Globecom 2001, November/December 2001, San Antonio, Tex., USA, incorporated herein by reference. In this method, two transmit antennas and two receive antennas are used advantageously to obtain both transmit/receive diversity benefit and increased data or symbol rate.

High rate space-time transmission concepts have been considered also for future WCDMA systems. Indeed, in the Third Generation Partnership Program (3GPP) document "Improved Double-STTD schemes using asymmetric modulation and antenna shuffling" TSG-RAN Working Group 1 (TSGR1#20(01)-0459) by Texas Instruments (incorporated herein by reference), proposed parallel transmission of Alamouti codes using four transmit antennas and two or four receive antennas. Although this method improves the symbol rate by a factor of two it obtains only limited diversity order, which limits the performance and realizable data rates.

SUMMARY OF THE INVENTION

It is an aim of embodiments of the present invention to address one or more of the problems discussed above.

The present invention provides a method to transmit complex symbols using a transmission matrix, said method comprising the steps of converting a stream of complex symbols to at least two at least partially different streams of complex symbols, a modulating said at least two streams of complex symbols to form at least two code matrices, at least one of which is of dimension greater than one, transforming said code matrices using linear transformations, to construct at least two transformed transmit diversity code matrices, constructing a transmission code matrix using at least two transformed transmit diversity code matrices, and transmitting said transmission code matrix, at least partially in parallel, using substantially orthogonal signaling resources and at least three different transmit antenna paths.

It is also an object of the invention to provide a method and apparatus for receiving a signal comprising a channel estimation module that outputs estimates of the impulse response estimates from each transmit antenna path to each receive antenna, and a detection module that uses the structure of a transmission matrix, said matrix comprising at least one linear combination of two orthogonal space-time code matrices or channel symbols, and channel impulse response estimates to calculate bit or symbol estimates for transmitted signal stream or streams.

It is further an object of the invention to provide an apparatus to transmit complex symbols using a transmission matrix, said apparatus comprising conversion means for converting a stream of complex symbols to at least two at least partially different streams of complex symbols, modulating means for modulating said at least two streams of complex symbols to form at least two code matrices, at least one of which is of dimension greater than one, transforming means for transforming said code matrices using linear transformations, to construct at least two transformed transmit diversity code matrices, code constructing means for constructing a transmission code matrix using at least two transformed transmit diversity code matrices and transmission means for transmitting said transmission code matrix, at least partially in parallel, using substantially orthogonal signaling resources and at least three different transmit antenna paths.

Other objects and characteristics of the present invention are apparent from the detailed descriptions explained in conjunction with the related drawings. The drawings are designed only to illustrate the inventive concept, and in no way limit the application of the invention, for which reference should be made to the appended claims.

DETAILED DESCRIPTION OF THE INVENTION

Figure 1:
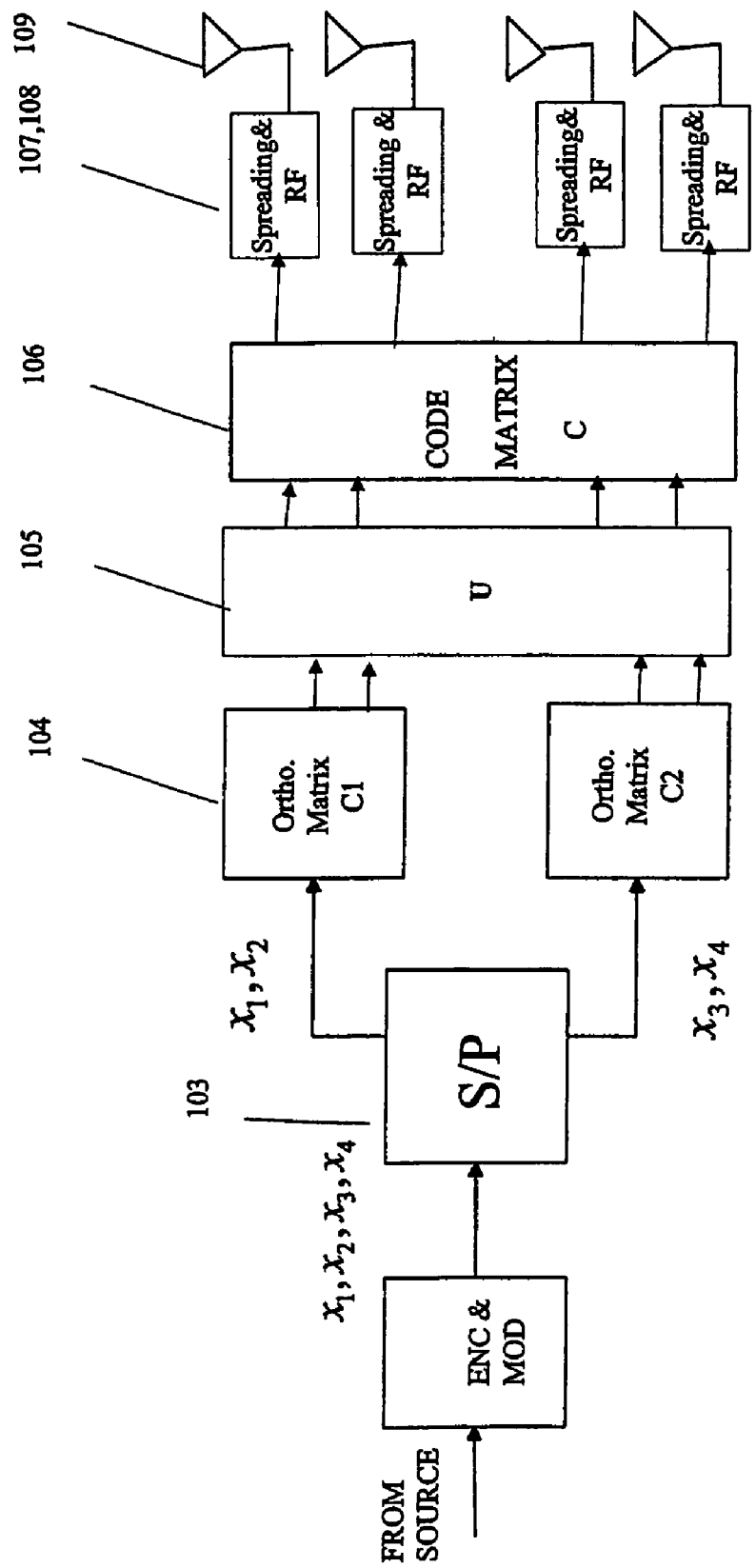
FIG. 1 depicts an exemplary transmit diversity system in accordance with the present invention.

Reference is made to FIG. 1, which illustrates a high rate transmitter diversity system which includes a transmitting apparatus 101, such as a base station, and a receiver 102, such as a mobile phone. The transmitting apparatus 101 includes serial-to-parallel (S/P) module 103, a plurality of transmit diversity modulation modules for constructing orthogonal matrices 104, at least one transform module 105, code construction module 106, signaling/spreading modules 107 and a plurality of RF (Radio Frequency) modules that convert the signal to analog waveforms 108, and transmitting antennas 109. The receiver 102 includes possibly more than one receiving antennas.

The S/P module 103 converts the possibly channel coded (ENC) (e.g. Turbo coded or convolutional coded) and modulated (MOD) complex valued symbol streams into at least two parallel complex valued symbol streams in which at least some of the complex symbols are different from each other. In modules 104, the two symbol streams are separately transmit diversity coded, using orthogonal (transmit diversity) code matrices C1 and C2, each of arbitrary dimension and rate. The symbols in the (transmit diversity) code matrices C1 and C2, or the (transmit diversity) code matrices themselves are mixed using a linear transformation U in module 105, to generate transformed transmit diversity code matrices X1 and X2. The transformed code matrices X1 and X2 are used to construct a transmission code matrix in C the code construction module 106. The transmission code matrix is transmitted using at least three transmit antennas or paths or beams 109 using any substantially orthogonal signaling, e.g. different orthogonal codes (e.g. Hadamard codes) or different time slots or different Fourier waveforms (OFDM waveforms/subcarriers) or different frequency bands can be used. If optional parallel transmission is used to increase the symbol rate the S/P module can output more than two symbol streams 110, to be eventually combined with other parallel streams or code matrices in code construction module 106.

As an example, the transformed code matrices can be formed in the transform module 105 as follows:

$$X1 = C1 + C2$$

$$X2 = C1 - C2 \quad (4)$$

in which C1 and C2 are two orthogonal transmit diversity codes, e.g. the 2 by 2 Alamouti matrices. It should be stressed that normalization, to maintain target symbol energy by diving by $\sqrt{2}$, has been omitted for simplicity.

To further improve performance, the symbols in the respective orthogonal transmit diversity codes C1, C2 may be taken from different modulation alphabets, effected e.g. by constellation rotations. This may be incorporated in the serial-to-parallel module (103), which may be more generally considered as a conversion means for converting a stream of complex symbols to multiple streams of complex symbols. Alternatively, or in addition, the transform module 105 may be generalized so that the transmission matrices are be formed using a unitary transformation matrix U, as $$X = UC \quad (5),$$

where (assuming only two code matrices are transformed)

$$C = \begin{bmatrix} C1 \\ C2 \end{bmatrix}$$

and U is for example, of the form $$U = V \otimes I$$

where V is a Unitary matrix and I is an identity matrix. Matrix V may assume the parameterized form $$V = \begin{bmatrix} \mu & \gamma \\ -\gamma^* & \mu^* \end{bmatrix}.$$

The Kronecker product, when combined with the identity matrix, maximizes the number of zero elements on the transformation matrix, and this reduces the peak-to-average ratio in the transmitter and provides a simple implementation. We may also further parameterize $$\mu = \sqrt{\alpha};$$

$$\gamma = \sqrt{1-\alpha} \exp(-j\phi\pi)$$

where $\alpha$ determines the relative powers within the linear combination matrix and $\phi$ a determines the phase of a complex phasor. The simple transformation (4) is obtained by setting $\alpha = \frac{1}{2}$, $\phi = 0$.

Return for simplicity to the special case provided in equation (4). The code construction module 106 takes the transformed transmit diversity code matrices X1 and X2 resulting form the linear combinations and constructs a transmission code matrix. For this, the code construction module 106 embeds the matrices X1 and X2 into a transmission code matrix with double the dimensions. The transformed code matrices can advantageously be transmitted in different time slots (time-orthogonal signaling) using four transmit antennas using a transmit diversity transmission code matrix $$C_{TR\text{-}AHOP} = \begin{bmatrix} X1 & \\ & X2 \end{bmatrix}. \quad (6)$$

Alternatively, to maintain better power balance one may transmit continuously using e.g. the transmit diversity transmission code matrix $$C_{Tr\text{-}OTD} = \begin{bmatrix} X1 & X2 \\ X1 & -X2 \end{bmatrix} \quad (7)$$

These transmission code matrices can be subjected e.g. to column and/or row permutations without affecting the code properties. The transmission code matrices may also be subjected to multiplying from the left and/or with a constant matrix.

To understand the benefits of the use of said linear (unitary) combinations, recall that the received signal (for simplicity in a flat fading channel) can be described as, y=Ch+n, where h is the vector of channel coefficients to a given receive antenna. An equivalent model signal model follows, when symbols within X1 and X2 and the channel matrix/vector are rearranged, y'=Hb+n', where H depends on the code matrix and the channel, b is a symbol or a bit vector, where different dimensions correspond to different transmitted symbol or bit streams. When symbols are QPSK modulated with Gray labeling, b may be considered to comprise I and Q components of each symbol, thus increasing the dimensionality of the vector by a factor of two.

The received equivalent correlation matrix, which can be used when detecting the symbols or bits, follows, when a space-time matched filter (i.e., conjugate transpose of H) is applied to the received signal y', to form a equivalent signal model after space-time matched filter z=Rb+n", where R is called an equivalent channel correlation matrix. This model can be used be the corresponding receiver e.g. by estimating the symbols or bits by minimizing (wrt. b)

$$\|z-Rb\|^2,$$

possibly under colored noise or, as an alternative, one may solve directly $$\|y-Hb\|^2,$$

where, as above, H is the equivalent channel matrix that depends on the transmission matrix. Detectors solving these equations are well-known. However, in order to arrive at these models we need to make sure the model matches the properties of channel vector/matrix and and transmission code matrix. As an example, when estimating bits or symbols using the equivalent channel correlation matrix, we need to know said matrix. For example, for codes (6) and (7), with $\alpha=\frac{1}{2}$, $\phi=0$, and with four transmit antennas, this results in code correlation matrix with structure $$R = aI_{NT} + \begin{bmatrix} 0 & b \\ b & 0 \end{bmatrix} \otimes I_2 \qquad (8)$$

with $$a = \sum_{j=1:NR} \sum_{i=1:NT} |h_{ij}|^2 \qquad (9)$$

$$b = \sum_{j=1:NR} \sum_{i=1:NT/2} |h_{ij}|^2 - \sum_{j=1:NR} \sum_{i=NT/2+1:NT} |h_{ij}|^2$$

Thus, the code above is non-orthogonal since the off-diagonal correlation values do not vanish. Correspondingly when $\alpha=1$, $\phi=0$ (in this special case the transmission code matrix reduces to STTD-OTD, known from prior art)

$$R = \begin{bmatrix} a_1 I_2 & 0 \\ 0 & a_2 I_2 \end{bmatrix}$$

where $$a_1 = \sum_{j=1:NR} \sum_{i=1:NT/2} |h_{ij}|^2$$

$$a_2 = \sum_{j=1:NR} \sum_{i=1:NT/2+1:NT} |h_{ij}|^2$$

This reflects the fact that different symbols obtain only partial transmit diversity, whereas in (8)-(9) the diagonal elements are identical, and thus all symbols obtain same power regardless of the channel realization. The equivalent correlation matrix can be used when detecting the symbols or bits. It is essential to notice that the code correlation matrix of the proposed code differs from that of prior art (e.g. ABBA) so that the former depends explicitly on channel power differences, while the latter depends on complex phases of the channel. This property of the inventive code can be used to advantage, when increasing the data rates of the transmission quality of the transmission system. In particular, the invented code is orthogonal when the channel is fully correlated, and in general the correlation coefficient diminishes as the channel correlation increases. Therefore, the code is suitable also for correlated channels, that can be described e.g. as correlated Rayleigh or Ricean channels. Conversely, the prior art non-orthogonal code (ABBA) remains non-orthogonal in these channels. The correlation properties of the physical channel depend on the environment, but it is generally known that antenna correlation increases when the transmitting or the receiving antennas are close to each other. With small base stations and especially with small terminals (mobile stations) this is likely the case in the future wireless systems.

To recapitulate, a general linear transformation matrix U, holds the aforementioned transformation (4), and the prior art code (known as STTD-OTD with 4 transmit antennas) as a special case: Transformation (4) is obtained by setting $\alpha=\frac{1}{2}$, $\phi=0$, and STTD-OTD code by setting $\alpha=1$. When $\frac{1}{2}<\alpha<1$ the code provides smaller transmit diversity benefit, as the diagonal values of the code correlation matrix differ from each each other more than in Equation (8). The advantage is that the code correlation values are smaller in magnitude. This simplifies detection in the receiving unit. In the extreme case, the code reduces to an orthogonal STTD-OTD like code, in the sense that the code correlation values (off-diagonal values of the code correlation matrix) are zero. It should be noted that the correlation matrix of the proposed code also leads to advantageous properties when the code is used on properly equalized ISI channels; the multipath components attenuate the non-orthogonality of the code. For this, the individual symbols may be interpreted as vectors of multiple symbols.

It is noted that when the constituent matrices C1 and C2 are both Alamouti matrices, the obtained code has symbol rate at least one (at least four different symbols can be transmitted in four time slots). The inventive transmission concept can also be used when increasing the symbol rate of the transmitting device. In this case several transformed transmit diversity code matrices are transmitted in parallel, preferably continuously to minimize power fluctuations in the transmitter (i.e. to minimize peak-to-average ratio in the RF power amplifiers). To this effect, a particularly advantageous embodiment is to fill up the anti-diagonal part of the TR-AHOP matrix above as follows $$C_{2TR-AHOP} = \begin{bmatrix} X1 & X3 \\ X4 & X2 \end{bmatrix}, \qquad (10)$$

in which the matrices X3 and X4 are formed analogously using linear transformations. Advantageously, the linear transformations used to construct X3 and X4 are different from the ones used to construct X1 and X2. For example, the modulation alphabets of symbols used to construct X3 and X4 may be different than the modulation alphabets of symbols used to construct X1 and X2. In effect, four parallel complex symbol streams are formed, a transformation is applied to two streams separately, and the two transformed transmit diversity code matrices are transmitted simultaneously and continuously from the transmitting devices, such that pair X1 and X2, and pair X3 and X4 both obtain full diversity benefit, and typically interference from each other.

The invention is in not way limited to the use of the Alamouti transmit diversity code as submatrices of the transformed code. In general, any orthogonal transmit diversity code defined for any number of transmit antennas can be used. All possible orthogonal transmit diversity code matrices were constructed in the patent application, WO/63826 A1, which is incorporated herein by reference. As an example codes C1 and C2 can be rate ¾ transmit diversity codes defined each for four transmit paths or antennas, in which case the resulting code is defined for eight transmit paths or antennas, with overall symbol rate ¾. Hence the rate is increased when compared to orthogonal transmit diversity codes, in which rate ½ cannot be exceeded using eight antennas, as is well known from prior art. Alternatively, code C2 may be defined (as taught in prior art) to have e.g. rate ½, while C1 has rate ¾ in which case the overall rate is ⅝.

Thus, the space time-code matrices C1 and C2 need not be the same, to enable a large number of different symbol rates. In addition, they need not even have the same dimension. Hence, (recalling the fact that the code dimension depends on the number of antennas), by using different code dimensions enables one to divide the transmitting elements (antennas) asymmetrically for the transformed code X1 and X2. As an example, if C1 is the Alamouti code of dimension two and C2 is rate ¾ code of dimension four (Appendix 1, eq. (4)), we have effectively symbol rate ⅞ and 6 antenna transmission, and C2 is defined as $$C2 = \begin{bmatrix} C1' & C2' \\ C1' & -C2' \end{bmatrix} \quad (11)$$

where C1' and C2' are two Alamouti codes (essentially STTD-OTD transmit diversity transmission matrix) formed with two different symbols. If the dimension is not the same it is understood that either the matrix with smaller dimension is canonically filled up with zeros when transforming the codes, or that the larger matrix is punctured (e.g. columns deleted), to allow the use of arbitrary number of transmit antennas, e.g. 6 in the above exemplary case.

Figure 2:
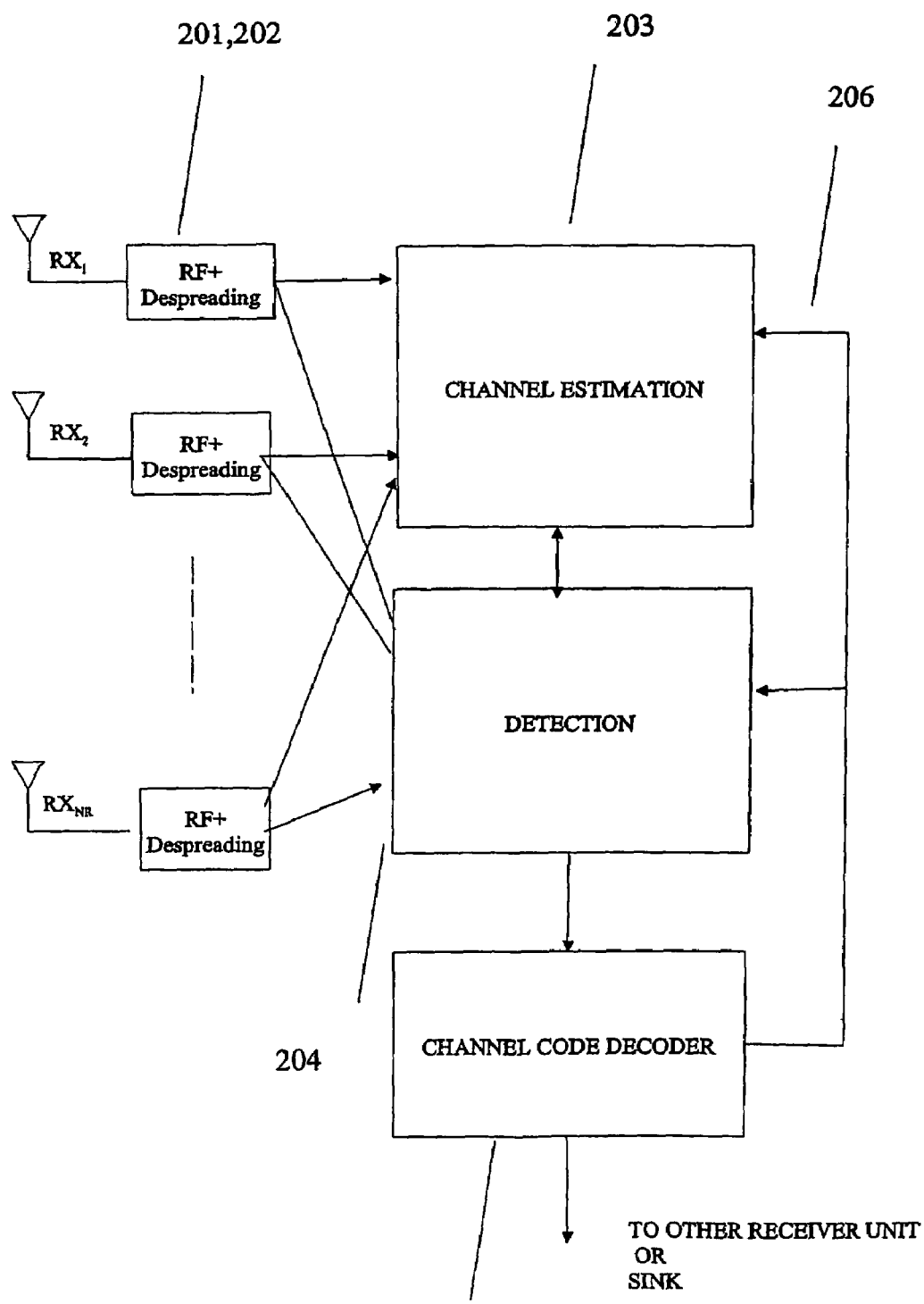
FIG. 2 depicts an exemplary receiver system for the proposed high rate transmission method
Figure 3:
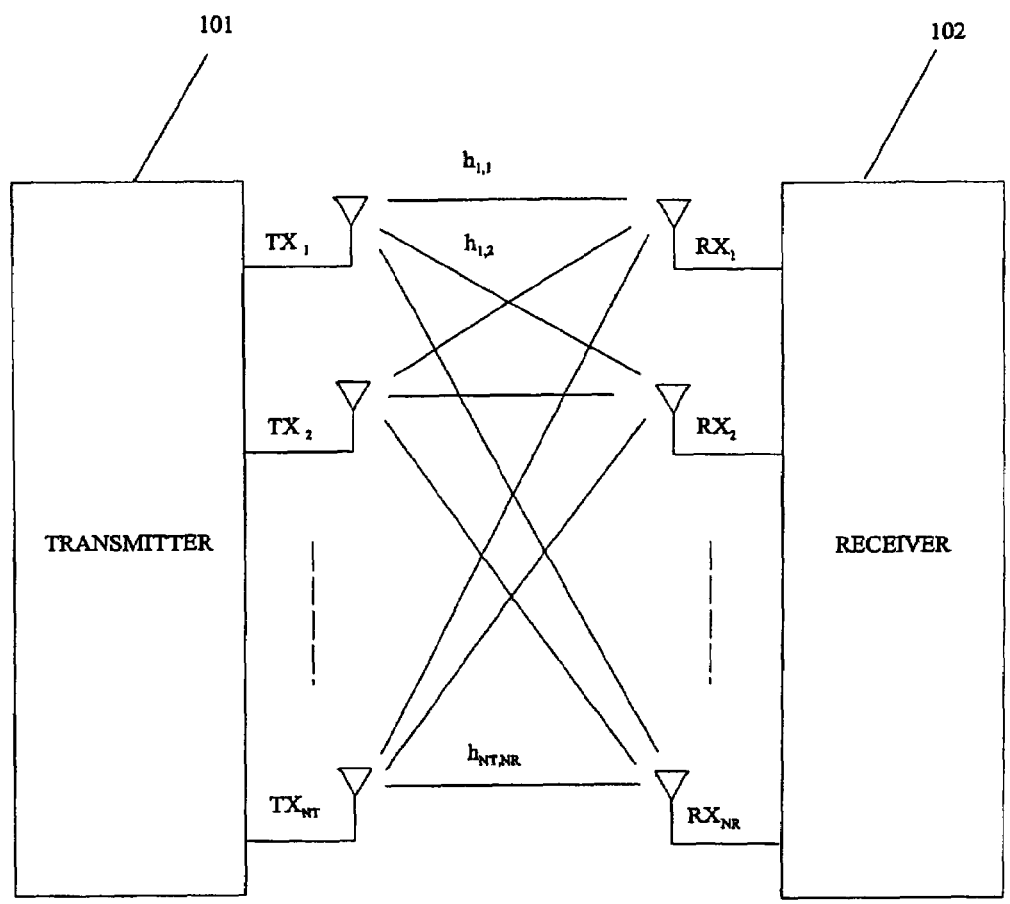
FIG. 3 depicts a multi-antenna transmitter-receiver pair in accordance with the invention.

FIG. 2 depicts a corresponding receiver, consisting of one or a plurality of receive antenna, and RF front-end modules 201, and despreading or channel-division units 202, that convert the signal to base band in which the space-time matched-filters and channel estimates provided by 203 together with suitable detection device 204 for detecting the symbols or bits in embedded in the transmission code matrix. The channel estimation unit 203 determines the complex channel coefficient for each transmit antenna-receive antenna pair. In a preferred embodiment the receiving unit uses the channel estimates (and perhaps also signal-to-noise ratio estimates) to construct the effective correlation matrix depending on the used transformation matrix. An explicit example for Transformation (4) was shown in equations (8) and (9) above. The detection device 204 can be any decoder or a joint-decoder and channel estimation unit, e.g. forming Minimum-Mean-Square-Error (MMSE) estimates of the transmitted symbols, or Maximum Likelihood estimates e.g. by a Viterbi algorithm, or soft-outputs (a posteriori probabilities) by an optimal or suboptimal MAP algorithm. Joint detection is enabling by allowing feedback and feedforward connections via 206 between the outputs delivered by detection, channel estimation, channel decoding units. Eventually, the channel decoder (e.g. Turbo decoder) forwards the decisions to other receiver units or to the targeted sink of the particular the source. These receiver concepts are generally well known, but when applied in the context of the present invention the receiver can utilize the code structure used in the transmitter, and possibly also the code correlation matrix similar to that of equation (8), for example.

While there have been shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that the method can be used with any substantially orthogonal signaling when transmitting the transformed transmit diversity code matrices over the channel. This includes the use of OFDM waveforms, wavelets, time-orthogonal waveforms, FDMA, and arbitrary substantially orthogonal spreading codes. Furthermore, the complex symbols modulating the entries of the transmit diversity code matrices can be from arbitrary complex modulation alphabets (QPSK, 8-PSK, 16-QAM, 4-PSK), or (possibly matrix valued) constellation rotated versions of these, and that different alphabets can be used for different streams of complex symbols. Also, the bits that are encoded in the complex symbols may be channel coded and/or interleaved. The channel code may be a block code, a trellis code, a convolutional code, a turbo code, a low-density parity check code, or any combination of these or any other code known in the art. The interleaver may be a bit, symbol or coordinate interleaver. The transmit paths to which the columns of the transmit diversity code matrix are transmitted can be formed by beams using at least two transmitting elements, or fixed beams using e.g. a Butler matrix, or by using beams controlled by the received using some feedback loop, or by any other method known in prior art to form a transmit path or transmit pats from the transmitter to the receiver. In addition, it is clear that although the method of the invention requires only one channelization waveform or code, if more than one are available the data rate can be directly increased using multicode transmission. Furthermore, it is considered apparent that the channel estimates required to detect the streams of complex symbols can be obtained e.g. by using common channel pilots, or dedicated channel pilots, or by using decision feedback, or any combination thereof. Also, for ISI channels it is possible to transmit symbol-vectors instead of symbols, with appropriate interpretations of the complex-conjugations, without parting from the scope of this invention. It is the intention, therefore, to be limited only as indicated by the scope of the claims appended hereto.

What is claimed is:

1. A method, comprising:
    estimating impulse response estimates from each transmit antenna path to each receive antenna; and
    calculating bit or symbol estimates for transmitted signal stream or streams using a structure of a transmission code matrix, said transmission code matrix comprising at least one linear combination of two orthogonal space-time code matrices and the impulse response estimates, wherein both the column and row matrix dimensions of the transmission code matrix are greater than the corresponding column and row matrix dimensions of the two orthogonal space-time code matrices.

2. The method of claim 1, wherein the bit or symbol estimates are hard decisions corresponding to a symbol alphabet used in a modulator.

3. The method of claim 1, wherein the bit or symbol estimates are soft decisions that reflect a reliability of the decision.

4. The method of claim 3, wherein the reliability is derived from bit or symbol a-posteriori probabilities.

5. The method of claim 1, wherein transmitted bits or symbols are channel coded, and a detector performs joint detection and decoding over the transmission code matrix and a channel code decoder.

6. The method of claim 5, wherein the joint detection and decoding uses reliability estimates calculated for the transmitted symbols or bits.

7. An apparatus, comprising:
- a channel estimator configured to output estimates of impulse response estimates from each transmit antenna path to each receive antenna; and
- a detector configured to use a structure of a transmission code matrix, which comprises at least one linear combination of two orthogonal space-time code matrices, and the impulse response estimates to calculate bit or symbol estimates for transmitted signal stream or streams,
- wherein both the column and row matrix dimensions of the transmission code matrix are greater than the corresponding column and row matrix dimensions of the two orthogonal space-time code matrices.

8. The apparatus of claim 7, wherein the bit or symbol estimates are hard decisions corresponding to a symbol alphabet used in a modulator.

9. The apparatus of claim 7, wherein the bit or symbol estimates are soft decisions that reflect a reliability of the decision.

10. The apparatus of claim 9, wherein the reliability is derived from bit or symbol a-posteriori probabilities.

11. The apparatus of claim 7, wherein transmitted bits or symbols are channel coded, and a detector performs joint detection and decoding over the transmission code matrix and a channel code decoder.

12. The apparatus of claim 11, wherein the joint detection and decoding method uses reliability estimates calculated for the transmitted symbols or bits.

13. An apparatus, comprising:
- outputting means for outputting estimates of impulse response estimates from each transmit antenna path to each receive antenna; and
- using means for using a structure of a transmission code matrix, which comprises at least one linear combination of two orthogonal space-time code matrices, and the impulse response estimates to calculate bit or symbol estimates for transmitted signal stream or streams, wherein both the column and row matrix dimensions of the transmission code matrix are greater than the corresponding column and row matrix dimensions of the two orthogonal space-time code matrices.

14. A method, comprising:
- estimating impulse response estimates from each transmit antenna path to each receive antenna; and
- calculating bit or symbol estimates of transmitted signal stream or streams using a structure of a transmission code matrix and the impulse response estimates,
- wherein the transmission code matrix can be expressed as being constructed using at least two transformed transmit diversity code matrices, wherein both the column and row matrix dimensions of the transmission code matrix are greater than the corresponding column and row matrix dimensions of the transformed transmit diversity code matrices,
- wherein the transformed transmit diversity code matrices can be expressed as being constructed by transforming at least two code matrices using linear transformations, and
- wherein the code matrices, at least one of which is of dimension greater than one, can be expressed as being formed by modulating at least two at least partially different streams of complex symbols that are obtainable from a single stream of complex symbols by conversion.

15. The method of claim 14, wherein the at least two transmit diversity code matrices are orthogonal transmit diversity code matrices.

16. The method of claim 14, wherein the transmission code matrix can be expressed as being constructed from the transformed transmit diversity code matrices using the method of embedding a lower-dimensional matrix into a higher-dimensional one.

17. The method of claim 14, wherein a first of the at least two transformed transmit diversity code matrix can be expressed as being constructed by summing two transmit diversity code matrices, and second of the at least two transformed transmit diversity code matrix can be expressed as being constructed by subtracting the said two transmit diversity code matrices.

18. The method of claim 14, wherein the transmission code matrix extends over a specified number of substantially orthogonal signaling resources, and wherein more than the specified number of complex symbols are used to construct the transmission code matrix.

19. The method of claim 18, wherein the substantially orthogonal signaling resources include at least one of the following: non-overlapping time slots, different spreading codes, different orthogonal frequency division multiplexing subcarriers, different wavelet waveforms and different frequency division multiple access channels.

20. An apparatus, comprising:
- a channel estimator configured to output estimates of impulse response estimates from each transmit antenna path to each receive antenna; and
- a detector configured to use a structure of a transmission code matrix and the impulse response estimates to calculate bit or symbol estimates for transmitted signal stream or streams, wherein the transmission code matrix can be expressed as being constructed using at least two transformed transmit diversity code matrices,
- wherein both the column and row matrix dimensions of the transmission code matrix are greater than the corresponding column and row matrix dimensions of the at least two transformed transmit diversity code matrices, and
- wherein the transformed transmit diversity code matrices can be expressed as being constructed by transforming at least two code matrices using linear transformations, and wherein the code matrices, at least one of which is of dimension greater than one, can be expressed as being formed by modulating at least two at least partially different streams of complex symbols that are obtainable from a single stream of complex symbols by conversion.

21. The apparatus of claim 20, wherein the at least two transmit diversity code matrices are orthogonal transmit diversity code matrices.

22. The apparatus of claim 20, wherein the transmission code matrix can be expressed as being constructed from the transformed transmit diversity code matrices using the method of embedding a lower-dimensional matrix into a higher-dimensional one.

23. The apparatus of claim 20, wherein a first of the at least two transformed transmit diversity code matrix can be expressed as being constructed by summing two transmit diversity code matrices, and second of the at least two transformed transmit diversity code matrix can be expressed as being constructed by subtracting the said two transmit diversity code matrices.

24. The apparatus of claim 20, wherein the transmission code matrix extends over a specified number of substantially orthogonal signaling resources, and wherein more than the specified number of complex symbols are used to construct the transmission code matrix.

25. The apparatus of claim 24, wherein the substantially orthogonal signaling resources include at least one of the following: non-overlapping time slots, different spreading codes, different orthogonal frequency division multiplexing subcarriers, different wavelet waveforms and different frequency division multiple access channels.

26. An apparatus, comprising:

outputting means for outputting estimates of impulse response estimates from each transmit antenna path to each receive antenna; and using means for using a structure of a transmission code matrix and the impulse response estimates to calculate bit or symbol estimates for transmitted signal stream or streams, wherein the transmission code matrix can be expressed as being constructed using at least two transformed transmit diversity code matrices, wherein both the column and row matrix dimensions of the transmission code matrix are greater than the corresponding column and row matrix dimensions of the at least two transformed transmit diversity code matrices, wherein the transformed transmit diversity code matrices can be expressed as being constructed by transforming at least two code matrices using linear transformations, and wherein the code matrices, at least one of which is of dimension greater than one, can be expressed as being formed by modulating at least two at least partially different streams of complex symbols that are obtainable from a single stream of complex symbols by conversion.

* * * * *